United States Patent

Salvi

[11] Patent Number: 5,605,356
[45] Date of Patent: Feb. 25, 1997

[54] AIR INFLATER ADAPTER

[76] Inventor: Stephen Salvi, 8 Deepwoods Dr., Natick, Mass. 01760

[21] Appl. No.: 442,699

[22] Filed: May 17, 1995

[51] Int. Cl.$^6$ ............................................. F16L 25/00
[52] U.S. Cl. ........................... 285/7; 265/9.2; 265/38; 265/177; 265/334.4
[58] Field of Search .................. 285/9.2, 7, 177, 285/38, 334.4; 137/861

[56] References Cited

U.S. PATENT DOCUMENTS

| | | | |
|---|---|---|---|
| 1,705,051 | 3/1929 | Thompson | 285/8 |
| 2,048,852 | 7/1936 | Dumas | 285/9.2 X |
| 2,185,725 | 1/1940 | Elliott | 285/177 X |
| 2,461,656 | 2/1949 | Norman | 285/9.2 X |
| 2,632,450 | 3/1953 | Allen | 285/9.2 |
| 2,949,244 | 8/1960 | Philippe | 285/9.2 X |
| 3,707,301 | 12/1972 | Rauls | 285/9.2 |
| 3,933,177 | 1/1976 | Dwyer | 137/861 |
| 4,511,163 | 4/1985 | Harris et al. | 285/177 |
| 4,722,556 | 2/1988 | Todd | 285/177 |
| 4,779,904 | 10/1988 | Rich | 285/177 X |

*Primary Examiner*—Dave W. Arola
*Attorney, Agent, or Firm*—Brian M. Dingman

[57] ABSTRACT

An adapter for connecting a source of air to a device to be inflated or deflated which has an air inlet opening. The adapter has a first larger hollow inlet end portion connectable to a source of air, and a second smaller outlet end portion including an elongated tube for insertion in the air inlet opening of the device to be inflated. The two end portions are connected by a smoothly tapered hollow conical portion which directs the air from the inlet portion to the outlet portion and into the device.

6 Claims, 1 Drawing Sheet

AIR INFLATER ADAPTER

FIELD OF INVENTION

This invention relates to an adapter for connecting an air pump or vacuum cleaner to a device to be inflated or deflated to allow easier and quicker inflation or deflation.

BACKGROUND OF INVENTION

Some adapters to inflate or deflate inflatable goods such as snow tubes, floats, rafts, beach balls and other similar objects neglect the aspect of being able to use more than one of the most commonly found air sources in most homes such as basketball pumps, bicycle pumps, and vacuum cleaners. Two such adapters are disclosed in U.S. Pat. No. 4,114,230 to MacFarland and U.S. Pat. No. 4,405,158 to Hubberman. The MacFarland adapter is limited to the use of a vacuum cleaner as an air source. In order to inflate a float at the beach, one would not take a vacuum cleaner, but rather something small and light weight such as a basketball pump or a bicycle pump. However, MacFarland works only with a vacuum cleaner. In addition, the MacFarland adapter cannot be attached to flexible tubes of various diameters, which would be useful when used in conjunction with the air sources previously mentioned. For example, a person may need to blow up 50 balloons for a party. Using MacFarland's adapter, that person would have to hold the nozzle of the vacuum, and the vacuum hose. This could become rather cumbersome and heavy after a while. If the adapter was equipped with a means of attaching a flexible tube of a desired length and diameter, the user could leave the vacuum nozzle on the ground, and just hold a lightweight flexible tube, thus making it easier to perform the task.

In addition, MacFarland lacks a means to help secure the adapter to the valve stem of the device being inflated (called an air inflatable). MacFarland also has a wall flared at a 45 degree angle, which may reduce the air flow, and overtax the vacuum cleaner motor because of excessive back pressure.

In Hubberman, the filler fitting has a continuous taper, and lacks a straight cylindrical shank or stem for the purpose of entering the valve stem of the air inflatable in order to open its recessed check valve. The outer shell of the Hubberman fitting is designed to hold the nozzle of a vacuum. However, the flat bottom of the shell will impede air flow, and could cause a great deal of buffeting, which would cause the adapter to push away from the vacuum nozzle thus making it difficult to maintain a connection. The Hubberman air passage is an automobile time valve stem, which has a small diameter, thus limiting air flow. This in combination with the flat-bottomed shell will restrict air flow, and may reduce the life expectancy of the motor of the vacuum when inflating large inflatables. The spring member of the Hubberman inlet tip needs to be removed for various operations thus making the device more difficult to use. Also, when very small pieces such as this need to be removed and then replaced back, the part can easily be lost or misplaced.

It is important to note that both inventions are limited in the relation to the volume of air flow that can be provided to the air inflatable when using a vacuum as the air source. The MacFarland design limits the possibility of providing a means of attaching flexible tubing of different diameters. In Hubberman, these restrictions are found in the outer shape having a flat bottom which is not conducive for maintaining a smooth air flow, and that a tire valve stem is used which has a specific diameter and shape and can not increase the volume of air to the air inflatable without major design changes.

For these reason and more which will become apparent in the detailed description, there exists a need for an adapter that will fulfill these needs and more.

SUMMARY OF THE INVENTION

This invention features an adapter designed to provide an effective and easy means to help facilitate in the inflation and deflation of air inflatables such as snow tubes, floats, rafts, beach balls, balloons and other similar objects. The adapter is used in conjunction with most common air sources found in homes today—devices such as basketball pumps, bicycle pumps, and certain vacuum cleaners or other similar devices which provide an air source. The adapter is tubular in design, having a main body, and hollow throughout. In one embodiment of the present invention, the adapter has one larger open inlet end cylindrical in shape with a portion of the end threaded on the outer perimeter of the larger end, which is then threaded onto the air source; the larger end acts as the air intake. A transitional portion of the central body is conical in shape and tapers from the larger open end towards the opposite smaller open outlet end; the conical shaped portion is ringed, ribbed, or has other embossing on its outer surface. The conical shape provides a seal against the valve stem of the inflatable in order to produce a higher air flow rate, and provides a smooth transition for the air flow from the inlet to the outlet. The embossed portion helps to secure the adapter to the valve stem, and the conical tapered shape is conducive for the attachment of flexible tubings of different diameters which can be slid onto the smaller end and slid onto the conical portion and provide an extension for ease of use, and when encountering larger valve stems.

In other applications, a portion of the conical shape can be cut, and flexible tubings of different diameters slid on in order to provide a higher volume of air to the air inflatable, in either application the tapered portion helps to secure the adapter to the valve stem. The smaller open outlet end is cylindrical in shape, having a smooth outer surface and a diameter capable of being inserted into the valve stem of the air inflatable and having a length suitable to open the recessed check valve of the inflatable.

The air source produces a flow of air which enters the adapter's larger open end of the main body and continues on through the transitional conical-shaped portion of the body and escapes out the opposite smaller end, which is inserted into the valve stem far enough to open the recessed check valve of the air inflatable. Disconnecting the adapter from the air source and leaving the adapter in the valve stem of the air filled inflatable will cause it to deflate.

In a larger version of the adapter of the present invention, the nozzle of a vacuum cleaner can be inserted into the larger open inlet end of the adapter, the vacuum cleaner providing the air source. The outer perimeter of the larger open end does not need to be threaded in this case. Rather, the larger end has an inside diameter sized to allow the nozzle of the vacuum cleaner to be friction fitted therein; the inside surface may have embossing to help hold the friction fit. Inflation or deflation occurs depending on which part the vacuum hose has been connected to.

The present invention thus allows a simple yet effective means to help facilitate the inflation or deflation of air inflatables using the most common air sources found in todays homes.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE PREFERRED EMBODIMENTS

In the description which follows, like parts are marked throughout the specification and drawings respectively. The drawings are not necessarily to scale and in some instances proportions may have been exaggerated in order to more clearly depict certain features of the invention.

One embodiment of the present invention features an adapter which is tubular in design and has a main body which is preferably molded of a semi-rigid plastic or other suitable material. Preferably the design is entirely one piece, but this is not a restriction. When viewed from an end, the cross section is circular in shape and hollow throughout, with a relatively consistent wall thickness.

Figure 1:
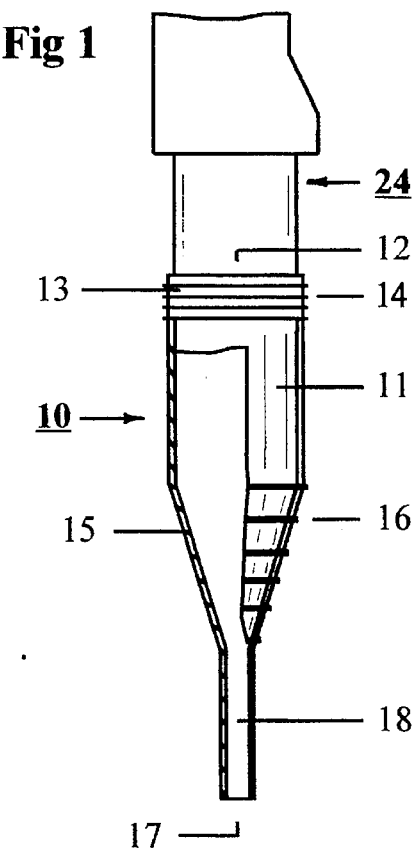
FIG. 1 is a partly cross-sectional view of one embodiment of an air inflater adapter according to this invention, showing its connection to a vacuum cleaner outlet hose as the source of air.
Figure 2:
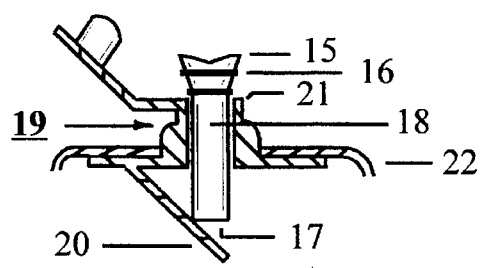
FIG. 2 is a greatly enlarged, partly cross-sectional drawing of an embodiment of an air inflater adapter according to this invention inserted into a device to be inflated.
Figure 3:
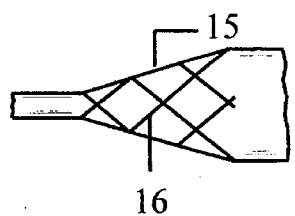
FIG. 3 is an enlarged view of one form of surface texturing of the conical portion of the adapter.
Figure 4:
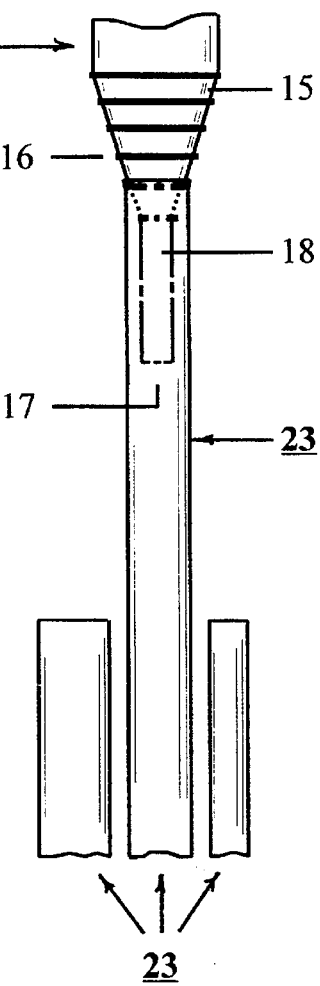
FIG. 4 is a partial view of an adapter according to this invention having connected thereto a flexible tubing for insertion in a device to be inflated to extend the reach of the adapter.

Referring now to the figures. This invention in one embodiment consists of an adapter 10 having a main body 11 comprised of one larger open inlet end 12, cylindrical in shape, having a threaded end 13 on its outer perimeter 14. There is a transitional conical portion 15 that tapers smoothly in a single conical section downward from the larger end 12. Conical portion 15 has a ringed, ribbed, scored or other embossed or textured outer surface 16 and tapers down to a smaller open outlet end 17 consisting of a straight shank 18 which has a smooth outer surface. FIG. 1 shows ribbing, and FIG. 3 scoring. Adapter 10 is used in conjunction with devices that can produce a flow of air, in one such example a basketball pump (not shown). Larger end 12 with its threaded end 13 is threaded into the pump, which can produce a flow of air when pumping the handle. Smaller end 17, consisting of a straight shank 18 is which is of suitable diameter to allow insertion into valve stem 19 of the air inflatable 22, is of a length that when inserted into valve stem 19 pushes open and holds open the recessed check valve 20 in order to inflate or deflate the air inflatable 22.

The flow of air produced by the pump then enters larger end 12 and flows through the main body 11 and exits out smaller end 17, which would be inserted into valve stem 19, causing air inflatable 22 to inflate. During inflation, conical portion 15 of main body 11 has several purposes; to name a few, conical portion 15 provides a seal when pressed against outer perimeter 21 of valve stem 19, which helps to reduce the amount of air loss during inflation. In addition, conical portion 15 tapers upwards away from smaller end 17 towards larger end 12 so when encountering larger diameters of valve stem 19 it still provides a seal. Textured outer surface 16 of conical portion 15 can also provide a secure connection to valve stem 19. Any roughening or irregularities in or on surface 16 will help in gripping—such are termed "texturing" or "embossing" herein. Conical portion 15 also allows for the attachment of flexible tubings 23 of larger diameters than smaller end 17; tubing can be slid onto the outer portion of said smaller end 17 and slid onto the conical portion 15, where it forms a seal and is secured in place by the textured outer surface 16. Tubings 23 act as an extension to ease in the facilitation of the inflation process so that a person does not have bend over the air inflatable or similar uncomfortable positions. Also, a portion of conical portion 15 can be cut, allowing flexible tubing 23 to be attached to the remaining portion of conical portion 15, thus creating a larger exposed outlet diameter, which would provide an increased air flow to the air inflatable with larger diameter openings, and thus provide faster inflation or deflation. Flexible tubings 23, when inserted into larger valve stems than valve stem 19, still provide the means to open the recessed check valve 20.

A larger version of the adapter 10 of the present invention can be connected to the nozzle 24 of a vacuum cleaner, which would act as the air source. The outer portion of the larger end 12 does not need to be threaded in this case, larger end 12 rather having an inside diameter sized to allow vacuum cleaner nozzle 24 to be friction fitted into the larger end 12 to provide a connection. Inflation or deflation occurs depending on which part the vacuum hose has been connected to—the exhaust outlet or inlet. The inside surface of larger end 12 can be textured to help maintain the friction fit with nozzle 24.

Various embodiments of the invention have now been described in detail. Changes in and modifications to the previously described embodiments of the present invention may be made without departing from the nature, spirit and scope of the invention. For example, the larger open end 12 on a smaller version of adapter 10 could have two wing protruding extensions (not shown) to facilitate in the process of threading the larger end 12 to a basketball pump. In a larger version of adapter 10, to be attached to a vacuum cleaner nozzle 24, a flared (or tapered) end or similar means (not shown) on the larger end 12 could be provided to accommodate different diameter nozzles. There could also be an aperture or other means (not shown) to allow a rubber (stretch) band to be secured through the aperture and extended onto the handle of the nozzle of the vacuum cleaner to further secure the adapter to the nozzle of the vacuum cleaner hose, and/or, depending on the pliability of the material used in producing the adapter, to further facilitate in the connection of nozzle 24 to the adapter 10. Accordingly the invention is not limited to said details except set forth in the appended claims.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A monolithic adapter of generally uniform wall thickness for connecting a source of air to a device to be inflated which has an air inlet opening, comprising:

a first larger hollow inlet end portion defining an enlarged generally cylindrical air inlet and connectable to a source of air;

a second smaller outlet end portion comprising an elongated, cylindrical tube defining a smaller cylindrical air outlet, for insertion in the air inlet opening of the device to be inflated; and a single, gradually-tapered hollow frustoconical portion directly connecting said inlet end portion to said outlet end portion sealingly-engaging and gripping the air inlet opening, for directing maximum air flow from said inlet portion into and out of said outlet portion into the device to be inflated.

2. The adapter of claim 1 in which said frustoconical portion includes an unsmooth outer surface to provide better gripping.

3. The adapter of claim 2 in which said surface includes a number of circular ridges.

4. The adapter of claim 2 in which said surface includes concentric rings.

5. The adapter of claim 1 further including threads along the outside of said inlet end portion to allow the adapter to be threaded onto a threaded-end pump.

6. The adapter of claim 1 in which said inlet end portion is tapered inside to accept different diameter vacuum cleaner exhaust hoses.

* * * * *

(12) EX PARTE REEXAMINATION CERTIFICATE (6245th)

United States Patent
Salvi

(10) Number: US 5,605,356 C1
(45) Certificate Issued: Jun. 10, 2008

(54) AIR INFLATER ADAPTER

(76) Inventor: Stephen Salvi, 8 Deepwoods Dr., Natick, MA (US) 01760

Reexamination Request:
No. 90/008,590, Apr. 12, 2007

Reexamination Certificate for:
Patent No.: 5,605,356
Issued: Feb. 25, 1997
Appl. No.: 08/442,699
Filed: May 17, 1995

(51) Int. Cl.
*F16L 37/02* (2006.01)
*F16L 37/00* (2006.01)
*F16L 25/00* (2006.01)

(52) U.S. Cl. .......... 285/7; 285/9.2; 285/334.4; 285/38

(58) Field of Classification Search .......... None
See application file for complete search history.

(56) References Cited

U.S. PATENT DOCUMENTS

| | | | |
|---|---|---|---|
| 4,678,014 | A | 7/1987 | Owen et al. |
| 4,921,402 | A | 5/1990 | Nelson et al. |
| 5,230,611 | A | 7/1993 | Shelton |

*Primary Examiner*—Jeanne M Clark

(57) ABSTRACT

An adapter for connecting a source of air to a device to be inflated or deflated which has an air inlet opening. The adapter has a first larger hollow inlet end portion connectable to a source of air, and a second smaller outlet end portion including an elongated tube for insertion in the air inlet opening of the device to be inflated. The two end portions are connected by a smoothly tapered hollow conical portion which directs the air from the inlet portion to the outlet portion and into the device.

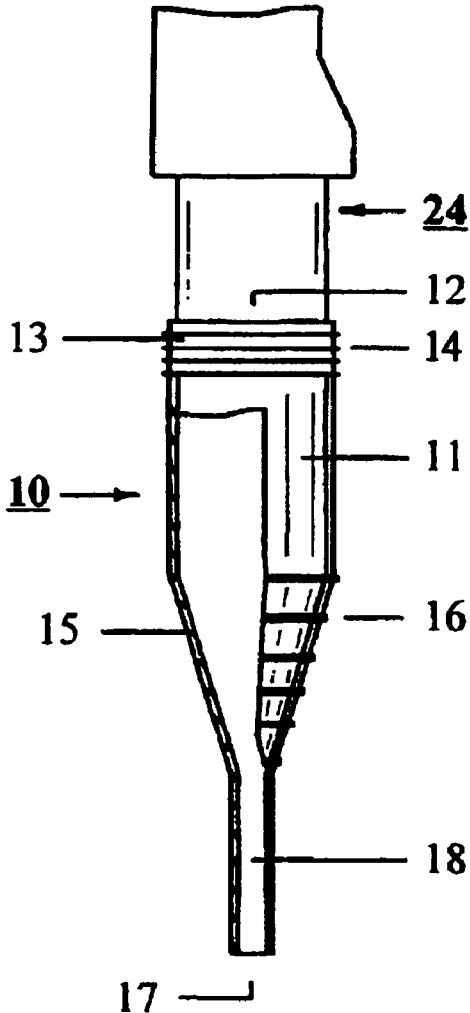

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 5 are cancelled.

Claims 2–4 and 6 were not reexamined.

* * * * *